United States Patent [19]
Yoshinaga

[11] Patent Number: 5,570,206
[45] Date of Patent: Oct. 29, 1996

[54] IMAGE READING APPARATUS

[75] Inventor: Kenji Yoshinaga, Tokyo, Japan

[73] Assignee: Canon Kabushiki Kaisha, Tokyo, Japan

[21] Appl. No.: 233,403

[22] Filed: Apr. 26, 1994

[30] Foreign Application Priority Data

Apr. 26, 1993 [JP] Japan .................................. 5-099311

[51] Int. Cl.$^6$ .............................. H04N 1/04; H04N 1/36; H04N 1/46; G03G 15/28

[52] U.S. Cl. ........................ 358/497; 358/412; 358/413; 358/482; 358/486; 358/474; 358/501; 358/512; 358/514; 358/505; 355/235

[58] Field of Search ..................... 358/471, 494, 358/474, 501, 512, 514, 497, 480, 481, 406, 504, 505, 510, 486, 409, 412, 413, 437, 450, 482, 483; 355/235; H04N 1/04, 1/36, 1/46; G03G 15/28

[56] References Cited

U.S. PATENT DOCUMENTS

| | | | |
|---|---|---|---|
| 3,560,651 | 2/1971 | Roth | 358/486 |
| 4,519,000 | 5/1985 | Frey et al. | 358/301 |
| 4,953,014 | 8/1990 | Takaragi | 358/77 |
| 4,972,273 | 11/1990 | Burkhardt et al. | 358/443 |
| 4,999,717 | 3/1991 | Nagashima | 358/448 |
| 5,079,624 | 1/1992 | Sasuga et al. | 358/521 |
| 5,113,260 | 5/1992 | Tandon | 358/474 |
| 5,114,236 | 5/1992 | Matsugu et al. | 356/401 |
| 5,121,230 | 6/1992 | Honma et al. | 358/494 |
| 5,161,029 | 11/1992 | Yamanishi | 358/497 |
| 5,239,393 | 8/1993 | Takeuchi | 358/413 |
| 5,264,949 | 11/1993 | Stemmle | 358/497 |
| 5,278,675 | 1/1994 | Kamiyama | 358/486 |
| 5,283,668 | 2/1994 | Hiramatsu | 358/486 |

*Primary Examiner*—Kim Yen Vu
*Assistant Examiner*—Kimberly A. Williams
*Attorney, Agent, or Firm*—Fitzpatrick, Cella, Harper & Scinto

[57] ABSTRACT

An image reading apparatus comprises a plurality of line sensors for reading images at different positions of a document sheet, a drive unit for relatively driving the line sensors to said document sheet, and a control unit for controlling the drive unit to intermittently effect the relative drive to read the document sheet image in a plurality of steps. The control unit controls the drive unit such that a drive distance by the relative drive is equal to an integer multiple of a read line width of the line sensors.

14 Claims, 7 Drawing Sheets

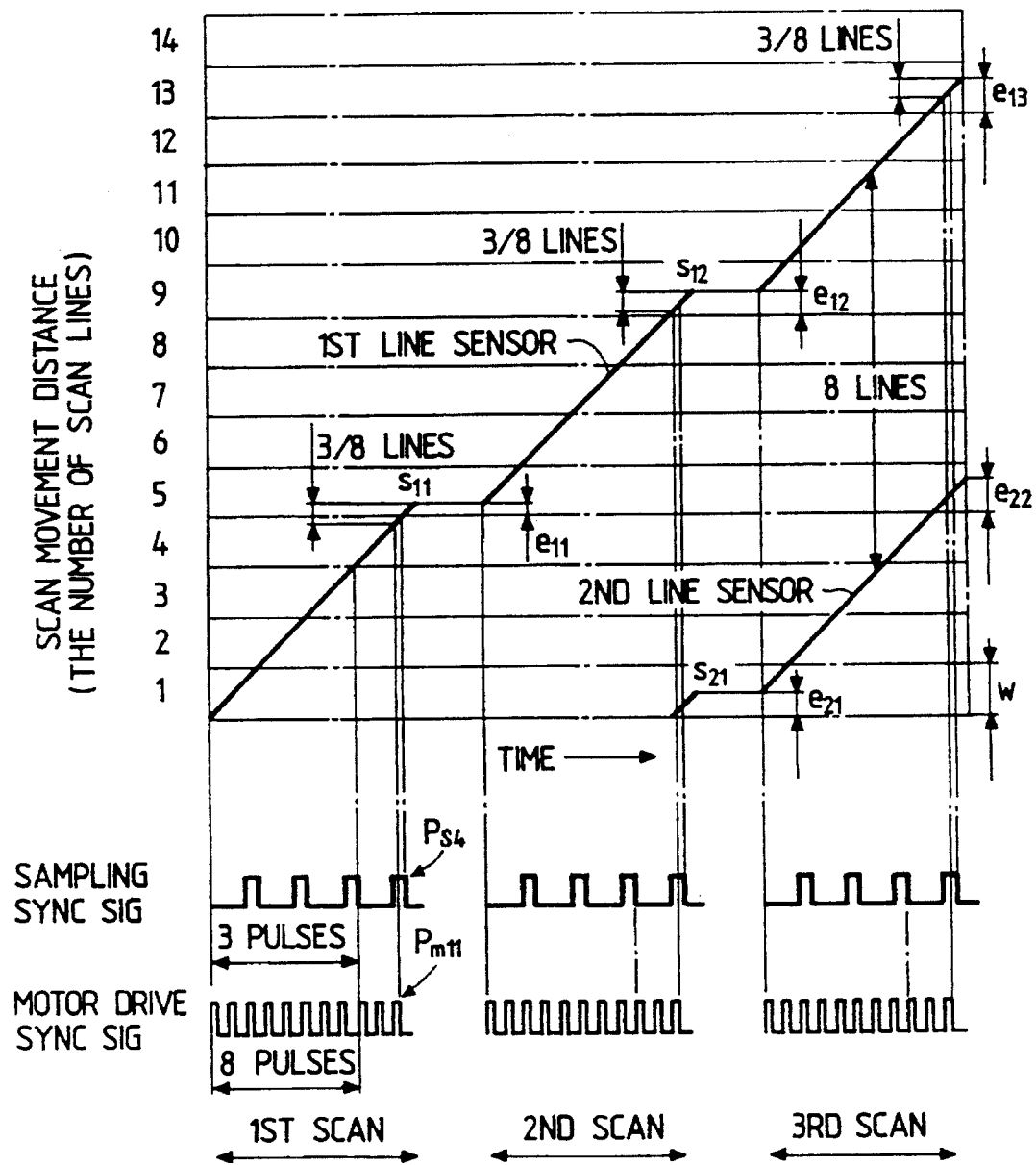

IMAGE READING APPARATUS

BACKGROUND OF THE INVENTION

1. Field of the Invention

The present invention relates to an image reading apparatus which reads an electrical signal of image information derived by scanning a plurality of photo-electric conversion elements relative to an optically coupled image. As an application, the present invention may be applied to an image scanner for a reflection type document sheet or a transmission type document sheet, or to an image reader unit of a copying machine or a facsimile machine.

2. Related Background Art

In an image reading apparatus which reads a color image, an image reading apparatus is known in which a color decomposition filter is inserted in an optical path between a document sheet image and a photoelectric conversion element to derive color-decomposed data of respective colors.

An example of such an image reading apparatus is disclosed in U.S. Pat. No. 4,953,01 assigned to the assignee of the present invention in which a plurality of photoelectric conversion elements (line sensors) are arranged at an appropriate pitch perpendicular (in a sub-scan direction) to a line direction (main scan direction), color decomposition filters are arranged for the respective line sensors, and reading of the respective color-decomposed data are assigned to the respective line sensors.

In this case, the line sensors sequentially output the read data from the pixels along the main scan direction in accordance with a synchronization signal, and the plurality of integral line sensors are physically moved relative to the document sheet image along the sub-scan direction to produce two-dimensional information.

In order to extract the color-decomposed data of the pixels on the document sheet image, it is necessary for each line sensor to correctly read the same pixel with a high positional precision. Considering one scan line on the document sheet image, the times when the parallelly arranged line sensors scan the scan line under consideration are different from each other but the line data of the respective line sensors are sampled in synchronism with the scan time of the scan line under consideration by the respective line sensors. Namely, the time required for the scan unit to move a distance between line sensors and the sampling period of the line sensors are synchronized.

In such an image reading apparatus, as the performance of the photo-electric conversion elements is improved, the read speed is increased and the amount of data to be processed is increased by the increased resolution and colorization. When a capability of a data processing unit connected to an output stage of the image reading apparatus is low and if nonintermittent image scan is continuously performed, the reading of the image data and the processing thereof are difficult to follow due to the image read operation because of the large volume of data and the high transfer rate. Thus, a so-called intermittent scan system is required in which the scan of a predetermined area of the document sheet image and the data processing by the succeeding stage data processing unit are intermittently repeated to complete the reading of the entire area of the image.

FIG. 7 shows a timing chart indicating the scan by the respective line sensors to the scan lines of the document sheet image when the image is read by the intermittent scan system in a prior art image reading apparatus.

In the prior art, a plurality of line sensors comprises a first line sensor and a second line sensor, and an interval therebetween is set to an 8-line length. An ordinate in FIG. 7 represents a relative scan position of each line sensor to a scan line of the document sheet image, and an abscissa represents a time in the scan process. In the prior art, a stepping motor is used as a drive source for the sub-scan direction scan, and a sampling synchronization signal for extracting data by the line sensor for each scan and a drive synchronization signal for the stepping motor are shown.

The stepping motor is rotated in proportion to the drive synchronization signal, and the number of pulses of drive synchronization signal and the distance of scan drive of the line sensor have one-to-one correspondence. In the present example, the scan drive corresponding to a ⅜ line length is made at the fall of the drive synchronization signal (pulse signal). The sampling synchronization signal is used for the synchronization to sample the image data stored during the one-line drive time and transfer it to the succeeding stage signal processing circuit. In the present example, the image data is sampled simultaneously with the fall of the sampling synchronization signal.

In such an image reading apparatus, when 8 pulses of a motor drive synchronization signal are applied, the line sensors are driven by the 3-line length and the sampling synchronization signal is applied three times during that period so that three lines of image data are sampled, as shown in FIG. 7.

The stop and resume timing of the read scan in the intermittent scan mode depends on the capability of the succeeding stage data processing unit and an operation program, and inconvenience may occur if the stop and resume timing of the read scan is arbitrarily set in accordance with various data processing units to be connected in the succeeding stages.

For example, it is now assumed that the intermittent scan is performed four lines at a time in the prior art apparatus. In order to scan and drive the first sensor to the fourth line in a first scan, it is necessary to generate at least 11 pulses of a motor drive synchronization signal. After the 11-th pulse. Pm11 (see FIG. 7) has fallen, a pulse Ps4 of the sampling synchronization signal falls and data in the fourth line is sampled. However, since the first line sensor is designed to be moved by ⅜ line length after the fall of the motor drive synchronization signal Pm11, it is now at a point S11 of FIG. 7.

Before the start of a second scan, the sampling sync signal and the motor sync signal are reset, and the second scan is started from the point S11 of FIG. 7. This includes an error e11 (shown in FIG. 7) form an intended normal start of scan position. In a similar manner, an error e12 is involved at the start of the third scan, and an error e13 is involved at the start of the fourth scan, and the error gradually increases. As a result, the data of the error image area generated after the completion of the respective scans are not extracted as the sampling data and the image data read by the first sensor is discrete for each scan and the image data in those areas are dropped.

Further, since the second line sensor is at a position spaced from the first line sensor by 8-line lengths, the area of the first scan line is partially read in the second scan. The second line sensor includes an error e21 which is equivalent to e12 at the start point of the third scan. As a result, the extracted data of the respective line sensors cannot be processed as one scan line data by merely imparting a delay between lines. Consequently, in the color image reading apparatus in which the reading of the color-decomposed data of the respective colors are assigned to the respective line sensors, the image data with color shift is supplied to the succeeding stage data processing unit.

SUMMARY OF THE INVENTION

It is an object of the present invention to allow reading of a document sheet image without a shift in read position when the document sheet image is intermittently read in a plurality of steps.

It is another object of the present invention to allow reading of one line by a plurality of line sensors in an intermittent read mode in a document sheet image reading apparatus in which a plurality of line sensors and the document sheet are relatively moved.

In accordance with the present invention, there is provided an image reading apparatus comprising a plurality of line sensors for reading images at different positions of a document sheet, drive means for relatively driving said line sensors said document sheet, and control means for controlling said drive means to intermittently effect the relative drive to read the document sheet image in a plurality of steps. The control means controls said drive means such that a drive distance by the relative drive is equal to an integer multiple of a read line width of said line sensors.

The above and other objects and advantages of the present invention will be apparent from the following description of the present invention.

BRIEF DESCRIPTION OF THE DRAWINGS

FIG. 7 shows a timing chart of the image reading by the intermittent scan system in a prior art image reading apparatus.

DETAILED DESCRIPTION OF THE PREFERRED EMBODIMENTS (First Embodiment)

Figure 1:
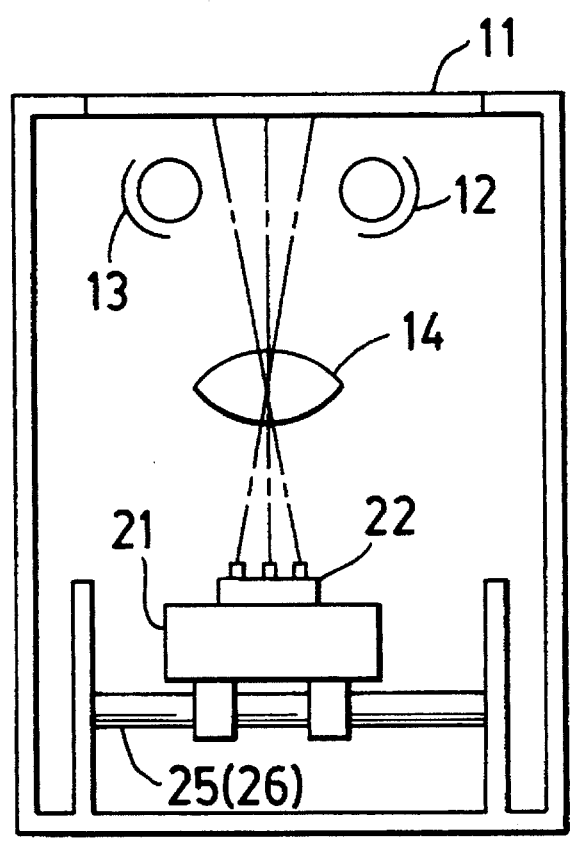
FIG. 1 shows a configuration of an image reading apparatus in accordance with a first embodiment of the present invention.

FIG. 1 shows a configuration of a first embodiment in which the present invention is applied to an image reading apparatus in which the drive of a subscan unit for reading an image is effected by the drive of line sensors.

In FIG. 1, numeral 11 denotes a document sheet mount glass on which a document sheet to be read is face-down mounted. The document sheet on the document sheet mount glass 11 is illuminated by lamps 12 and 13 and a reflected light from the document sheet is directed to three line sensors of a sensor unit 22 through a lens 14.

The sensor unit 22 is fixedly supported by a sensor support 21 which is reciprocally movable by a drive mechanism to be described later along two scan rails 25 and 26. The direction of movement of the sensor support 21 defines a sub-scan direction and the entire area of the document sheet is read by the line sensors line by line through the movement along the sub-scan direction.

As seen from FIG. 1, the read positions on the document sheet of the three line sensors of the sensor unit 22 are shifted by a predetermined distance along the sub-scan direction.

Figure 2:
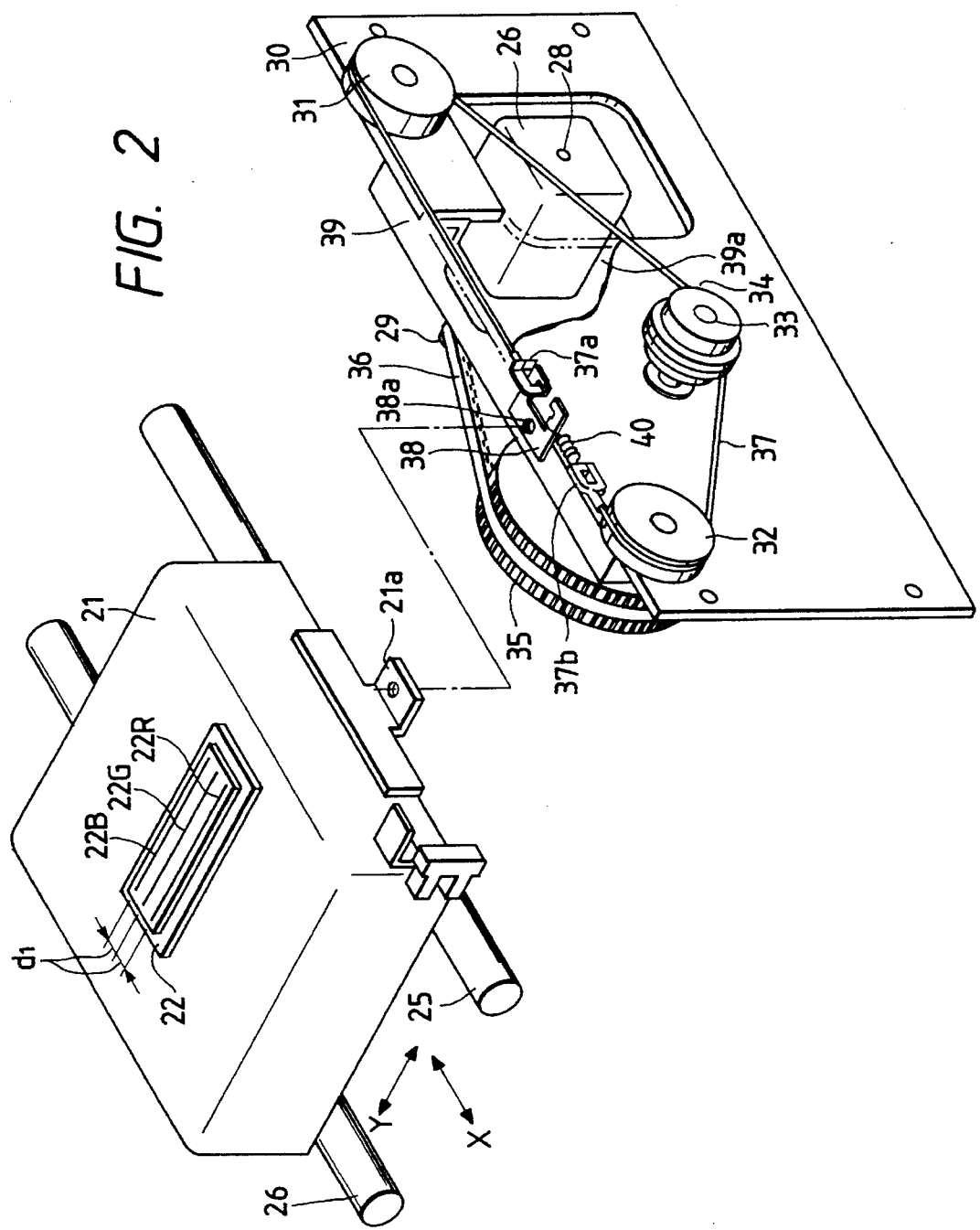
FIG. 2 shows a detailed configuration of the image reading apparatus of FIG. 1.

FIG. 2 shows a drive mechanism for the sensor support 21 in the image reading apparatus of FIG. 1.

In FIG. 2, a box-like drive auxiliary plate 39 having a plane 39a parallel to a drive base table 30 is fixed to a rear plane of the drive base table 30, and a drive shaft 33 is rotatably supported by a bearing by the plane 39a of the drive auxiliary plate 39 and the drive base table 30.

A wire pulley 34 is fixed to a front end of the drive shaft 33 and a large pulley 35 for a timing belt is fixed to a rear end of the drive shaft 33. A stepping motor 26 is fixed to the plane 39a of the drive auxiliary plate 39 and an output shaft 28 of the stepping motor 26 extends rearward from the drive auxiliary plate 39. A small pulley 29 for the timing belt is fixed to an end of the output shaft 28.

The timing belt 36 is spanned between the small pulley 29 and the large pulley 35 and transmits a rotation force of the stepping motor 26 to the drive shaft 33. Follower pulleys 31 and 32 are rotatably supported at top right and left corners of the drive base table 30 and a wire 37 wound on the wire pulley 34 is wound up to deflect the direction of the wire 37.

A right end terminal 37a of the wire 37 is hooked to a right hook of an engagement plate 38 and a left end terminal 37b is hooked to a left hook of the engagement plate 38 through a tension spring 40. The wire 37 is spanned with an appropriate tension to form a closed loop.

On the other hand, the sensor unit 22 is mounted on the top of the sensor support 21 as described above. The sensor (unit) 22 comprises three integrated line sensors 22R, 22G and 22B which function as photoelectric conversion elements, and photo-sensing planes thereof are face up. The respective line sensors have red, green and blue color-decomposition filters so that a color image is color-decomposed by three colors, red, green and blue to extract color-decomposed data of the respective colors. A unit pixel length along an X axis of the line sensors 22, that is, a scan line width w1 on the line sensors 22 is uniform, and an interval d1 between the line sensors 22 is also uniform.

The document sheet image is optically focused immediately above the sensor support 21, and the scan rails 25 and 26 are fixed to the apparatus body at positions corresponding to the focused image. A sensor driver circuit board 2 (shown in FIG. 3) is arranged in the sensor support 21 to drive the sensor unit 22 and read the image data. The image data along the line (Y axis) of the respective line sensors are sequentially read pixel by pixel in accordance with a sync signal from the sensor driver circuit board 2, and the sensor support 21 is mechanically scanned along the X axis by the scan rails 25 and 26 to produce two-dimensional data.

An engagement 21a of the sensor support 21 is in an overlapping positional relation to the top of the engagement 38 so that the drive unit and the sensor unit are coupled by fitting the engagement 21a to a bolt hole 38a. In the present embodiment, a phase of a current applied to an excitation coil of the stepping motor 26 is switched in accordance with a drive sync signal of the stepping motor 26 so that a rotation of a predetermined angle is imparted. A scan drive distance (corresponding to a relative drive distance x in the present invention) of the sensor support 21 to a unit pulse of the drive sync signal is 3.75 µm, a unit pixel length along the X axis, that is, a line width w1 on the sensor plane is 10 µm, and a distance between line sensors is 6-line length, that is, 60 µm which is an integer multiple (6 times) of the scan line width.

Thus, when 8 pulses of drive sync signal are applied to the stepping motor 26, the sensor support 21 is driven by 30 µm, that is, 3-line lengths. The 8 pulses of the motor drive sync signal, the scan drive distance of 30 µm and the 3 scan lines are minimum unit of the intermittent scan drive distance in the present embodiment. In the present embodiment, it is assumed that the drive distance (relative scan drive distance S) in the intermittent scan is 6-line lengths which is twice of the minimum unit. A sampling period of the line sensors 22 is set such that 3 periods are included during the supply of 8 pulses of motor drive sync signal, that is, the period of scan drive of three lines.

Figure 3:
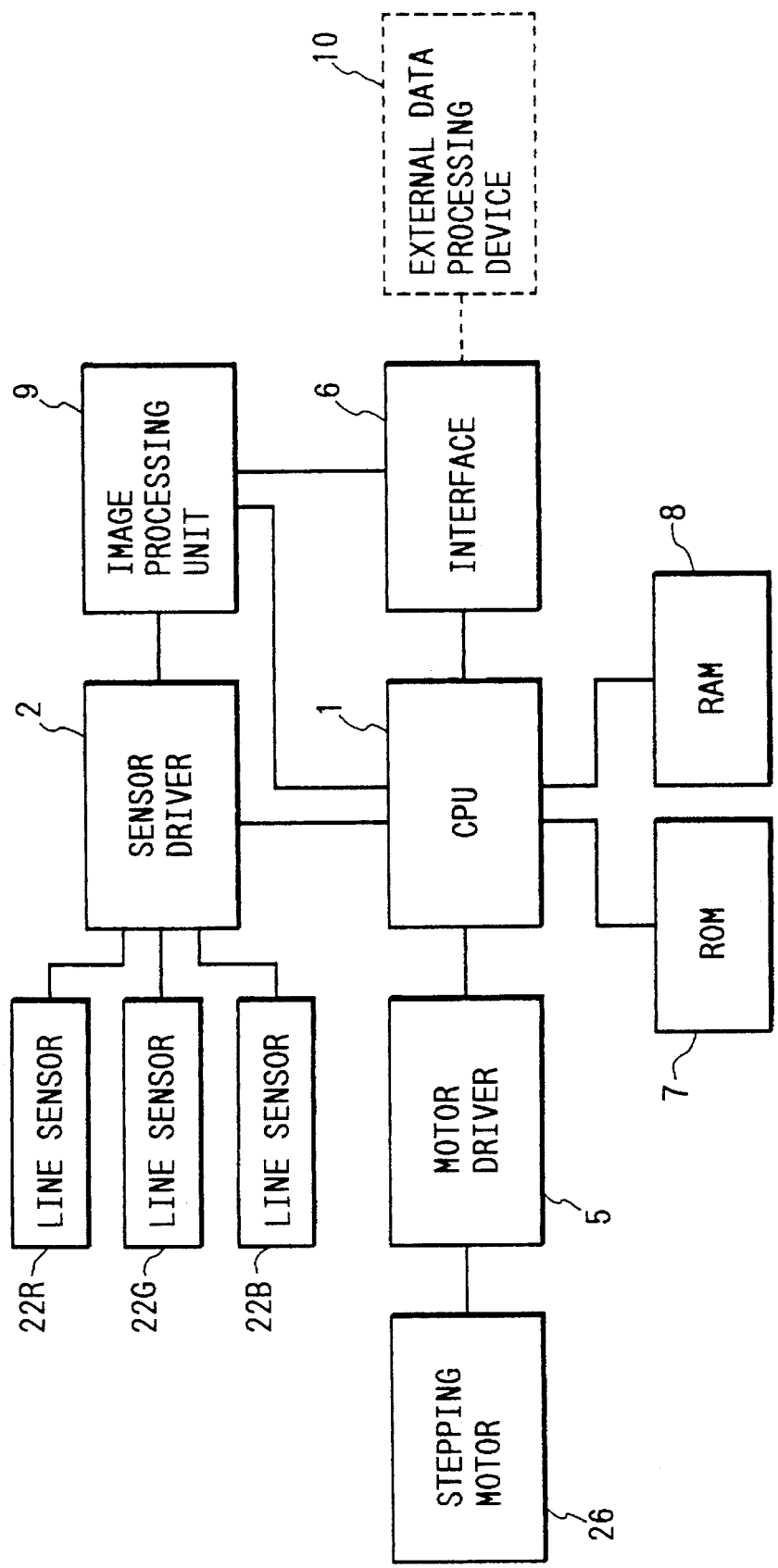
FIG. 3 shows a block diagram of a control unit in the first embodiment.

FIG. 3 shows a control unit in the first embodiment.

A motor driver 5 receives a motor drive sync signal from a CPU (central processing unit) 1 and drives an excitation circuit of the stepping motor 26 in accordance with the motor drive sync signal so that the motor is rotated in a one-to-one correspondence relation. In the present embodiment, the scan drive of ⅜ line length is effected at the fall of the drive sync signal.

A sensor driver 2 receives the sampling sync signal from the CPU 1, drives the line sensors 22R, 22G and 22B in accordance with the sampling sync signal and extracts line data from the respective line sensors. In the present embodiment, the image data is sampled simultaneously with the fall of the sampling sync signal. The extracted line data is transferred to an image processing unit 9 through the sensor driver 2.

When 8 pulses of the motor drive sync signal are applied from the CPU 1 to the motor driver 5, the line sensors are scanned and driven by 3-line lengths and the sampling sync signals are supplied three times from the CPU 1 during this period so that three lines of image data are sampled. The image processing unit 9 effects correction and interpolation to the image data extracted by the line sensors 22R, 22G and 22B and process them into desired data. The processed image data is transferred to an interface 6 in accordance with an instruction from the CPU 1.

The interface 6 interfaces data for defining the number of read scan lines and control signals such as a start of scan signal and an end of scan signal, with an external data processing unit 10 (such as a personal computer) connected to an output stage of the image reading apparatus as shown in FIG. 3, and transfers them to the CPU 1 and outputs the image data from the image processing unit 9 to the external data processing unit 10.

The CPU 1 controls the timing of the operation of the above functional blocks. An operation program thereof is stored in a ROM 7 and the CPU 1 sequentially reads the program to execute it. At the beginning of the operation, the CPU 1 communicates with the external data processing unit 10 through the interface 6 to determine the number of read scan lines. In the present embodiment, it is assumed that the control data is exchanged so that 6 lines of scan data are uniformly read. At the start of the image scan, the CPU 1 issues a motor drive sync signal in response to the start of scan signal from the external data processing unit 10 and transmits it to the motor driver 5 to drive the stepping motor 26.

Further, the CPU 1 issues a sampling sync signal for the line sensors 22 to extract the image data and transmits it to the sensor driver 2. In the present embodiment, during the intermittent scan under the control of the CPU 1, 16 pulses of motor drive sync signal are issued for one scan drive, and during this period, 6 pulses of sampling sync signal are issued. Thus, 6 lines of line data are extracted. The CPU 1 functions as the pulse generation and control means.

When the scan is completed, the CPU 1 issues an end of scan signal, transmits it to the external data processing unit 10 through the interface 6 and outputs the data read by the line sensors through the interface 6 to initiate the processing of the data. When the data processing is completed, the external data processing unit 10 again issues a start of scan signal and the scan is repeated. A RAM (random access memory) 8 stores variables required for the control, operation results and the image data generated by the image processing unit 9, which are read into the CPU 1 as required.

Figure 4:
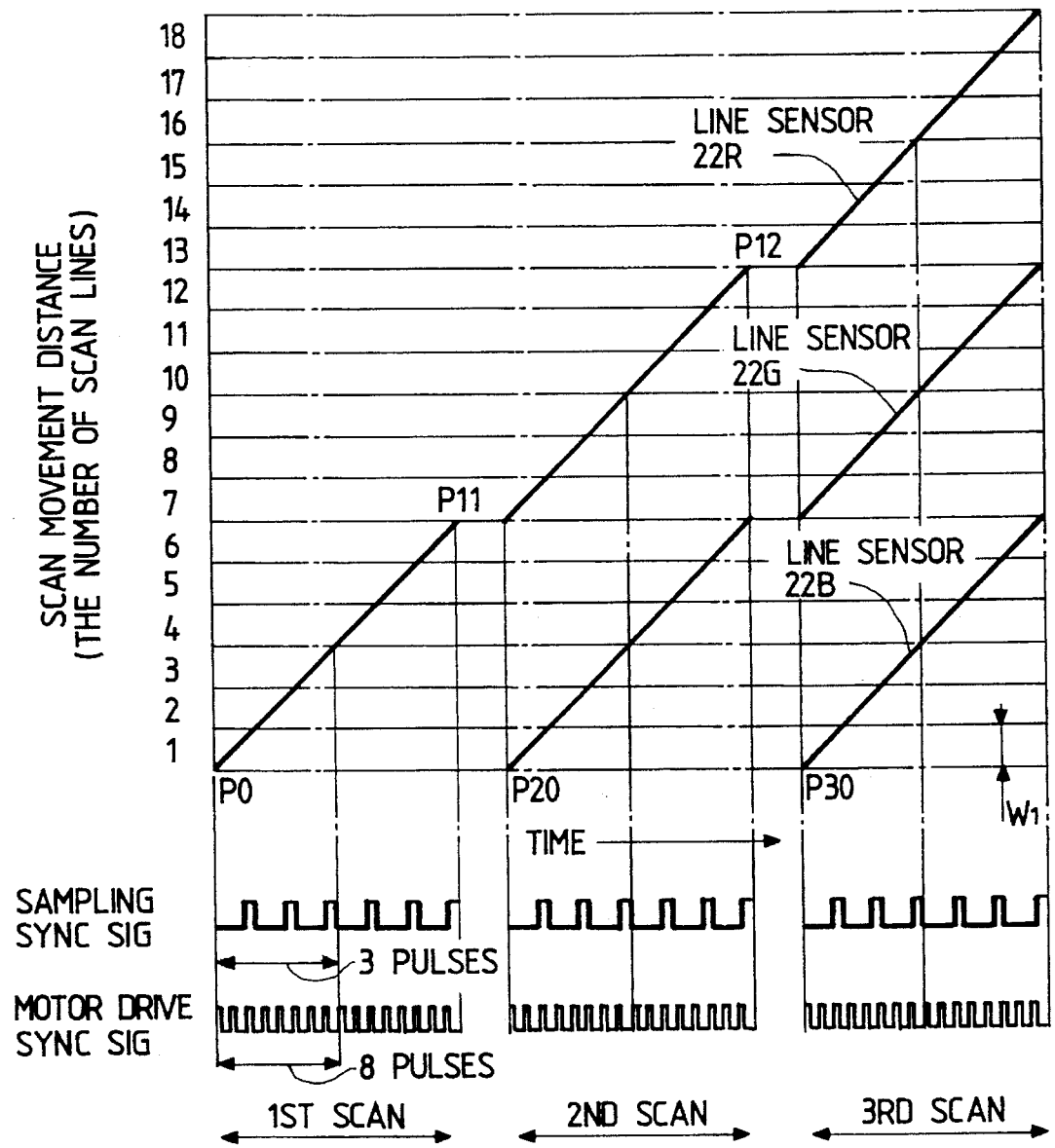
FIG. 4 shows a timing chart for the scan and drive of each line sensor in each intermittent scan in the first embodiment.

FIG. 4 shows a timing to scan and drive the line sensors 22 for each intermittent scan.

An abscissa in FIG. 4 represents a time axis on which the drive sync signal of the stepping motor 26 and the sampling sync signal for extracting the image data by the line sensors 22 are described, and an ordinate represents a distance of scan drive of the line sensors 22R, 22G and 22B during the intermittent scan, in the unit of scan line width w1.

Immediately before a first scan, the line sensor 22R which is ahead in the scan direction (X axis) is positioned immediately before the first line of the image to be read (point P0). On the other hand, the succeeding line sensor 22G is 6 lines behind the line sensor 22R and the line sensor 22B is 12 lines behind the line sensor 22R.

When the first scan is started under this condition, 16 pulses of drive sync signal are applied form the CPU 1 to the motor driver 5. During this period, the sensor support 21 is driven by 6-line lengths and the line sensor 22R reads the area of the document sheet image corresponding the lines 1–6 in response to the sampling sync signal from the CPU 1, and it finally reaches a point P11. Under this condition, the adjacent line sensor 22G is at a position P20 of FIG. 3, which is equivalent to the initial position P0 of the line sensor 22R.

When the processing of the data read in the first scan is completed by the succeeding stage external data processing unit 10, the scan is again effected in response to the end of data processing signal from the external data processing unit 10.

In a second scan, 16 pulses of drive sync signal are further applied to the motor driver 5 from the CPU 1 to the previous state. During this period, the sensor support 21 is driven by 6-line lengths and the line sensor 22R reads the area of the document sheet image corresponding to lines 7–12 in response to the sampling sync signal from the CPU 1, and it finally reaches a point P12. The line sensor 22G is at a scan position which is same as that of the line sensor 22R in the first scan and it reads the area of the document sheet image corresponding to lines 1–6. Accordingly, the line sensors 22R and 22G can sample the image data of the same line in spite of the fact that they scan the lines 1–6 of the document sheet image at different timings. At the end of the scan, the succeeding line sensor 22B is immediately before the line 1 of the document sheet image (point P30 in FIG. 3).

When the processing of the data read in the second scan is completed by the succeeding external data processing unit 10, the scan is again effected in response to the end of data processing signal from the external data processing unit 10. In a third scan, 16 pulses of drive pulse are further applied to the motor driver 5 from the CPU 1 to the previous state. During this period, the sensor support 21 is driven by 8-line lengths and the line sensor 22R reads the area of the document sheet image corresponding to lines 13–18 in response to the sampling sync signal from the CPU 1. The scan position of the line sensor 22G at this time is the same as that of the line sensor 22R in the first scan so that it reads the area corresponding to the lines 7–12 at an equivalent timing. The line sensor 22B reads the image at the equivalent timing to that of the line sensor 22R in the first scan and the line sensor 22G in the second scan.

By repeating the above read operation, the line sensors 22R, 22G and 22B can sample the image data of the same lines in the intermittent scan mode in spite of the fact that the timings of the scan to the same line on the document sheet image are different. When the color decomposition data are output scan line by scan line, that is, when the image data is output in the so-called line sequential manner, the image data read by the line sensor which is at a relatively ahead read position may be output through delay means having a delay corresponding to the scan line interval to the image data by the succeeding line sensor so that the color-decomposed data may be simultaneously output for each scan line or sequentially output for each color.

(Second Embodiment)

Figure 5:
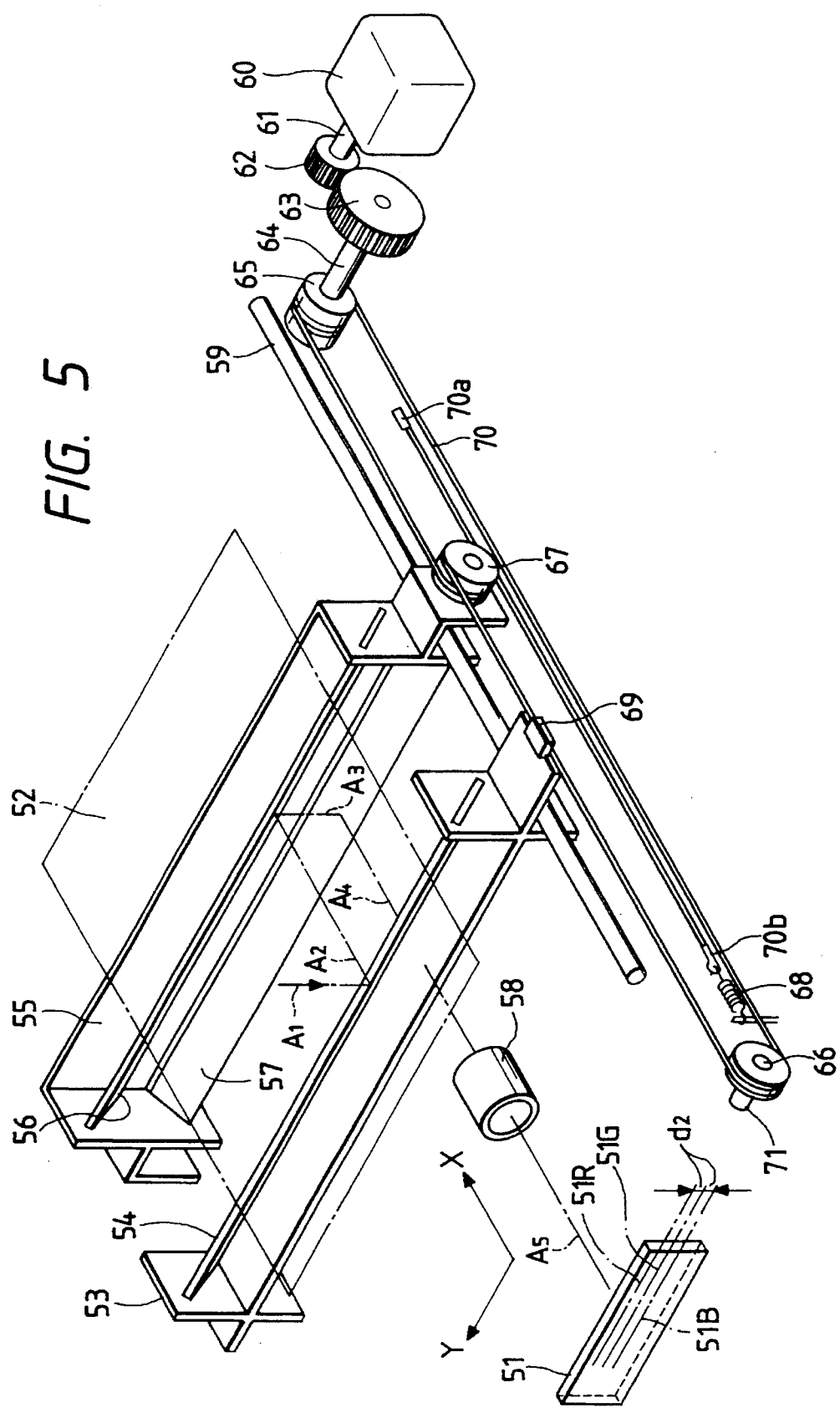
FIG. 5 shows a configuration of an image reading apparatus in accordance with a second embodiment of the present invention.

A second embodiment in which the present invention is applied to an image reading apparatus having an optical mirror system as the scan means is now explained. FIG. 5 shows a configuration of the second embodiment.

In FIG. 5, a sensor unit 51 comprises three integrated line sensors 51R, 51G and 51B as it does in the first embodiment, and an interval between line sensors is set to d2. A document sheet 52 is horizontally mounted on a top of a mechanism of the present embodiment.

A first mirror table 53 supports a first mirror 54 with a reflection plane faced right and inclined by 45° to a horizontal plane, and it is supported by a scan rail 59 to allow movement along an X axis. A second mirror table 55 supports a second mirror 56 and a third mirror 57, and it is supported by the scan rail 59 to allow the movement along the X axis. The second mirror 56 has a reflection plane face left and inclined by 45° to the horizontal plane, and the third mirror 57 has a reflection plane face left and set to make a relative angle of 90° to the second mirror 57.

A focusing lens 58 is arranged below the mirror tables and focuses the reflected light of the image of the document sheet illuminated by a lamp, not shown, reflected by the first mirror 54, the second mirror 56 and the third mirror 57 as shown by A1, A2, A3, A4 and A5, to a photo-sensing area of the sensor unit 51.

A drive gear 62 is fixed to an output shaft 61 of the stepping motor 60. The drive shaft 64 is rotatably supported by the apparatus body and a follower gear 63 is fixed at one end thereof, which meshes with the drive gear. A wire pulley 65 is fixed to the other end of the drive shaft 64 and a wire 70 to drive the mirror system is wound thereon.

From one end 70a of the wire 70, the wire 70 extends to a wire pulley 65 through a second pulley 67 rotatably supported by the second mirror table 55, wound around the wire pulley 65 several turns, passes through a first pulley 66 rotatably supported on a pulley shaft 71 which is fixed to the apparatus body, and again wound around a second pulley 67. The other end 70b of the wire 70 is supported by the apparatus body through a tension spring 68. The wire 70 and the first mirror table 53 are coupled by a coupling member 69 between the first pulley 66 and the second pulley 67.

When the stepping motor 60 is rotated, the wire pulley 65 is rotated through the drive gear 62 and the follower gear 63. Then, the first mirror table 53 is driven along the X axis (sub-scan direction) by an amount corresponding to the wire 70 wound up on the wire pulley 65. The image of the document sheet 52 is thus scanned. The second mirror table 55 is driven on one half of the drive distance of the first mirror table 53 by the principle of a movable pulley, but since the one-half of the drive distance is added in each of reciprocal paths A2 and A4 of the light beam path from the document sheet 52, that is, A1, A2, A3, A4 and A5, the total light path length from the document sheet plane to the focusing lens 58 is constant irrespective of the scan position of the first mirror table 53 and the image of the document sheet 52 can always be projected to the sensor unit 51 for reading.

Settings of the units in the second embodiment are as follows.

Assuming that a rotation angle per drive sync signal pulse of the stepping motor 60 is θ (rad), a ratio of rotation of the drive gear 62 and the drive gear 63 is α, and a diameter of a pitch circle to the wire 70 of the wire pulley 65 is D, a drive distance per input drive pulse of the stepping motor 60 on the first mirror table 53, that is, a unit scan drive distance Lm on the document sheet is given by:

$$Lm = D\theta\alpha/2$$

Assuming that a magnification factor of the focusing lens 58 is β, the image scan drive distance per drive sync signal of the stepping motor 60, that is, a unit scan drive distance Ls on the sensor plane is given by:

$$Ls = Lm\beta = D\alpha\beta\theta/2$$

In the second embodiment, assuming that a scan line width on the focus plane is W2, the interval between line sensors is d2, a period of the sampling sync signal of the sensor unit 51 is Ts, and a period of the motor drive sync signal is Tm, the settings may be made to meet the following relation:

$$3w2 = 8Ls$$

$$d2 = 6w2 = 16Ls$$

3Ts=8Tm so that the scan unit scans three lines for 8 pulses of motor drive sync signal. When 16 pulses of motor drive sync signal are applied for each scan and six lines are scanned each time, the first scan line read by the preceding line sensor at the beginning of the scan is read by the succeeding line sensor at the beginning of the next scan, and the same relation as that in the read operation of FIG. 4 by the first embodiment is attained.

(Third Embodiment)

Figure 6:
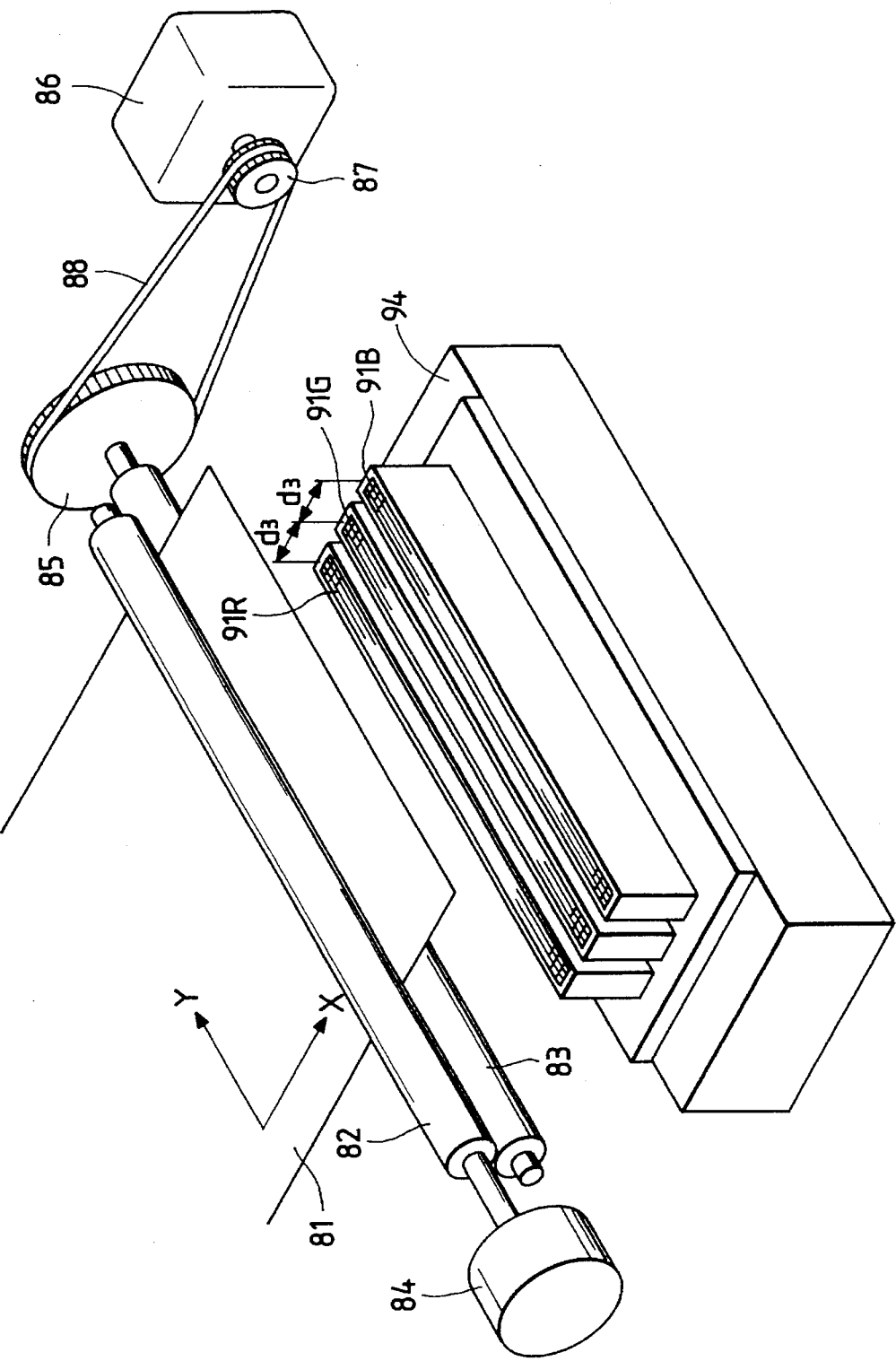
FIG. 6 shows a configuration of an image reading apparatus in accordance with a third embodiment of the present invention.

A third embodiment in which a document sheet image is scanned when a sheet-like document sheet is fed by feed means is now explained. FIG. 6 shows the third embodiment.

In FIG. 6, a document sheet 81 bears an image to be read on a bottom plane thereof and it is fed along the X axis by an operator.

An upper feed roller 82 and a lower feed roller 83 have the opposite ends thereof rotatably supported by bearings, not shown, to hold and feed the document sheet 81. A follower pulley 85 is coupled to a right end of the lower feed roller 83 which is rotated together with the upper feed roller 82. A feed motor 86 comprises a DC motor whose rotating speed is controlled by a voltage, and a rotation force thereof is transmitted to a drive pulley 87 fixed to an output shaft and to a follower pulley 85 through a transmission belt 88.

A rotary encoder 84 detects an angle of rotation of a detection shaft by generating pulse signals promotional in number to the angle of rotation of the detection shaft. The detection shaft is coupled to a left end of the upper feed roller 82 to detect the rotation angle of the upper feed roller 82. Since the document sheet 81 is held between the upper feed roller 82 and the lower feed roller 83 and fed thereby, there is a one-to-one correspondence relation between the angle of rotation of those rollers and the drive distance of the document sheet 81. Accordingly, the feed distance of the document sheet 81, that is, the scan drive distance may be detected by the detection signal of the rotary encoder 84.

Rod lens arrays 91R, 91G and 91B focus object images located thereabove at lower positions with unity magnification. A width thereof along the Y axis is substantially equal to the width of the document sheet 81 so that the image over the entire width along the Y axis of the document sheet 81 may be focused.

Those rod lens arrays 91R, 91G and 91B are arranged with an equal interval d3 therebetween. In an image detecting unit 94, line sensors 95R, 95G and 95B, not shown, having a plurality of photo-sensing elements arranged over the width substantially corresponding the width of the document sheet to be read are arranged with the interval of d3 therebetween at the focus positions of the corresponding rod lens arrays 91R, 91G and 91B. The line sensors 95R, 95G and 95B function to extract red, green and blue color-decomposed data from the document sheet image, as they do in the previous embodiment.

Means for feeding back the detection signal of the rotary encoder 84 to the control unit is further provided to control the feed motor 86 so that intermittent scan of the sheet-like document sheet 81 by a predetermined drive distance may be attained by the feed rollers 82 and 83. The pulse generated by the rotary encoder 84 may be frequency-divided to generate a signal which is generated for each scan drive corresponding to one scan line width and it may be used as the sampling sync signal of the previous embodiment so that the sampling of image data for each scan line may be attained. In the present embodiment, a feed distance f per detection pulse of the rotary encoder is set to f=12.7 μm, the width of each line sensor along the X axis, that is, the line width w3 is set to an integer multiple of the feed distance f, that is, w3=5×f=63.5 μm, the interval of the line sensors d3 is set to an integer multiple of the line width w3, that is, d3=100×w3=6350 μm, and the scan drive distance s per scan in the intermittent scan mode is set to an integer multiple of the line width w3 and also an integer multiple of the feed distance f per pulse of the rotary encoder, that is, s=100×w3=100×5×f=6350 μm, then one line is scanned at every fifth pulse of the detection signal of the rotary encoder and the scan line read by the preceding line sensor is read by the succeeding line sensor 100×5=500 pulses later. Accordingly, the line sensors 91R, 91G and 91B can sample the image data of the same line in spite of the fact that the timings of scan to the same scan line of the document sheet image are different, as they can in the previous embodiment.

The above embodiments may be modified as follows.

1) In the above embodiments, the drive unit has a mechanism to transform the rotation drive force to the linear reciprocal movement. Alternatively, a drive force for directly generating a linear drive force such as a linear motor may be used.

2) The scan drive distance in the intermittent drive mode need not be uniform but it may be changed to shorten the total process time depending on the operation condition of the data processing apparatus connected to the succeeding output stage of the image reading apparatus, provided that the above conditions, that is, the scan drive distance is the integer multiple of the scan line width and also the integer multiple of the unit drive distance of the scan drive unit are met.

As described above, since the scan drive distance in the intermittent scan mode is always the integer multiple of the line scan width and also the integer multiple of the unit drive distance of the scan drive unit, the synchronization of the scan line position for each scan and the sampling period of the image data is assured. As a result, the additional drive due to the residual of the unit drive distance of the drive unit after the sampling of the image data encountered in the prior art apparatus is eliminated and the drop of the image data corresponding the additional movement is prevented, and the offset of the detection line which has been a cause of color shift in the prior art is eliminated. Accordingly, image reading with a better quality is attained.

While the preferred embodiments of the present invention have been shown and described, it should be understood that the present invention is not limited thereto but various modifications thereof may be made without departing from the spirit of the invention the scope of the claims.

What is claimed is:

1. An image reading apparatus, comprising:

a plurality of line sensors for reading an image of a document, said line sensors being arranged such that lines read at a given instant by adjacent line sensors mutually differ;

moving means for causing relative movement of said line sensors and the document; and control means for controlling said moving means to intermittently effect the relative movement so as to read the entire image of the document in a plurality of steps, wherein said control means controls the stop positions of the respective relative movements effected intermittently so that a line read by one of the line sensors before the suspension of the relative movement, is read by another line sensor after the resumption of the relative movement.

2. An image reading apparatus according to claim 1, wherein said moving means includes a stepping motor for causing the relative movement in accordance with drive pulses.

3. An image reading apparatus according to claim 2, wherein said control means controls the supplying of the drive pulses to said stepping motor.

4. An image reading apparatus according to claim 1, wherein said line sensors have color decomposition filters of different colors from each other to color-decompose and read a color image of the document.

5. An image reading apparatus according to claim 1, wherein said moving means causes the relative movement for a first number of lines in accordance with a second number of drive pulses, the first number being different from the second number.

6. An image reading apparatus according to claim 5, wherein said control means controls application of the drive pulses to said moving means so that an amount of each of the relative movements effected intermittently is equal to an integer multiple of an interval between adjacent liens read by each of said line sensors.

7. An image reading apparatus according to claim 6, wherein said control means controls the number of the drive pulses supplied to said moving means.

8. An image reading method, comprising the steps of:

reading an image of a document by a plurality of line sensors, said line sensors being arranged such that lines read at a given instant by adjacent line sensors mutually differ;

causing relative movement of said line sensors and the document by a moving means; and controlling said moving means by a control means to intermittently effect the relative movement so as to read the entire image of the document in a plurality of steps, wherein said control means controls the stop positions of the respective relative movements effected intermittently so that a line read by one of the line sensors before the suspension of the relative movement is read by another line sensor after the resumption of the relative movement.

9. An image reading method according to claim 8, wherein said moving means includes a stepping motor for causing the relative movement in accordance with drive pulses.

10. An image reading method according to claim 9, wherein said control means controls the supplying of the drive pulses to said stepping motor.

11. An image reading method according to claim 8, wherein said line sensors have color decomposition filters of different colors from each other to color-decompose and read a color image of the document.

12. An image reading method according to claim 8, wherein the moving means causes the relative movement for a first number of lines in accordance with a second number of drive pulses, the first number being different from the second number.

13. An image reading method according to claim 12, wherein the control means controls application of the drive pulses to the moving means so that an amount of each of the relative movements effected intermittently is equal to an integer multiple of an interval between adjacent lines read by each of the line sensors.

14. An image reading method according to claim 13, wherein the control means controls the number of the drive pulses supplied to the moving means.

\* \* \* \* \*

UNITED STATES PATENT AND TRADEMARK OFFICE
CERTIFICATE OF CORRECTION

PATENT NO. : 5,570,206

DATED : October 29, 1996

INVENTOR(S) : KENJI YOSHINAGA

It is certified that error appears in the above-identified patent and that said Letters Patent is hereby corrected as shown below:

COLUMN 1

Line 22, "No. 4,953,01" should read --No. 4,953,014--.
  Line 54, "nonintermittent" should read
    --non-intermittent--.

COLUMN 2

Line 4, "of-each" should read --of each--.
  Line 41, "pulse." should read --pulse--.
  Line 50, "form" should read --from-- and "ell" should
    read --ell--.
  Line 54, "the-error" should read --the error--.

COLUMN 3

Line 59, "subscan" should read --sub-scan--.

COLUMN 6

Line 34, "form" should read --from--.

COLUMN 7

Line 44, "mirror 57." should read --mirror 56.--.

COLUMN 8

Line 48, "3Ts=8Tm" should be centered.

UNITED STATES PATENT AND TRADEMARK OFFICE
CERTIFICATE OF CORRECTION

PATENT NO. : 5,570,206

DATED : October 29, 1996

INVENTOR(S) : KENJI YOSHINAGA

It is certified that error appears in the above-identified patent and that said Letters Patent is hereby corrected as shown below:

<u>COLUMN 10</u>

```
Line 27, "invention" should read --invention or--.
Line 43, "movement," should read --movement--.
Line 66, "liens" should read --lines--.
```

Signed and Sealed this

Seventeenth Day of June, 1997

*Attest:*

BRUCE LEHMAN

*Attesting Officer*  Commissioner of Patents and Trademarks